No. 676,949. Patented June 25, 1901.
G. C. HAWKINS.
ELECTRIC HEATER.
(Application filed Sept. 26, 1898.)
(No Model.) 2 Sheets—Sheet 1.
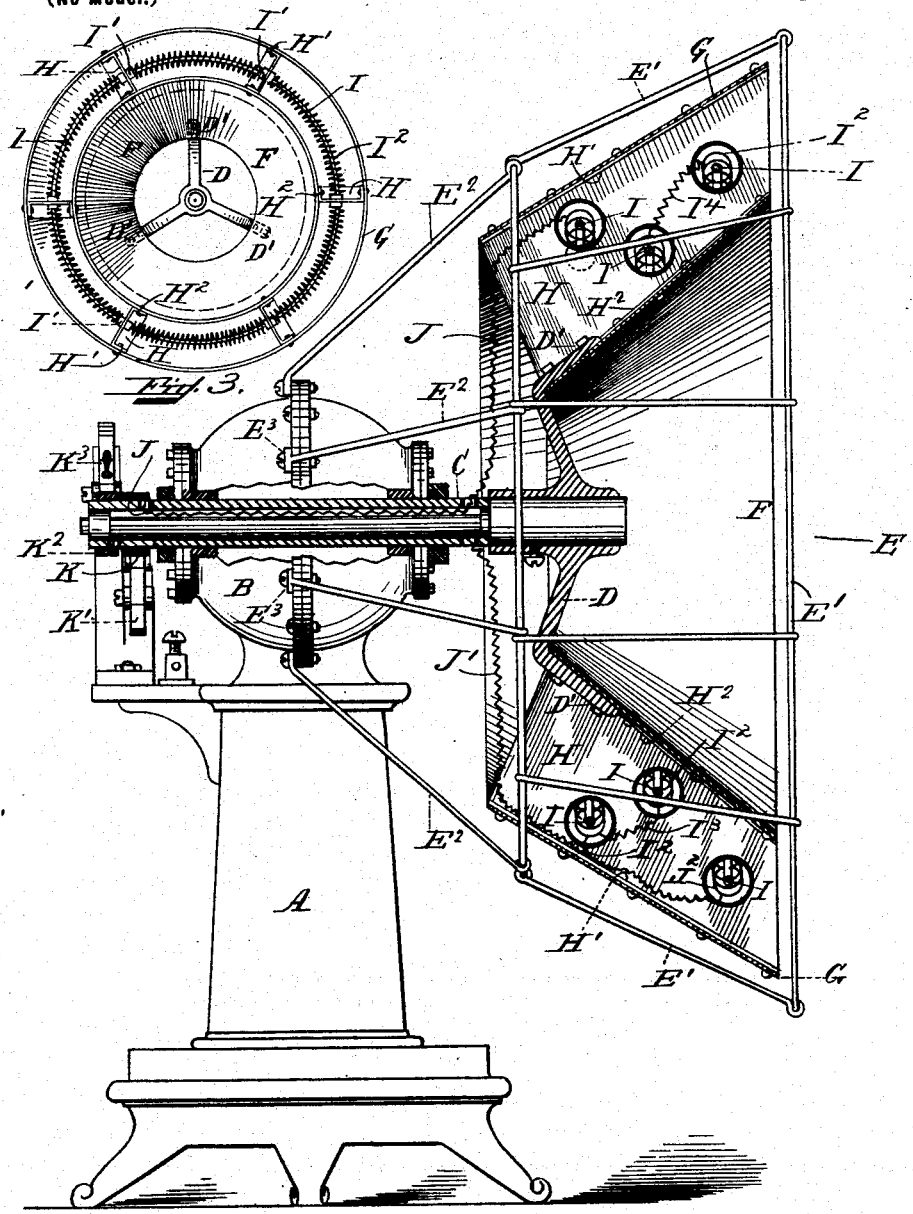
Witnesses:
A. L. Russell
C. A. Stewart
Inventor:
Gardner C. Hawkins
By J. S. Rush
Atty

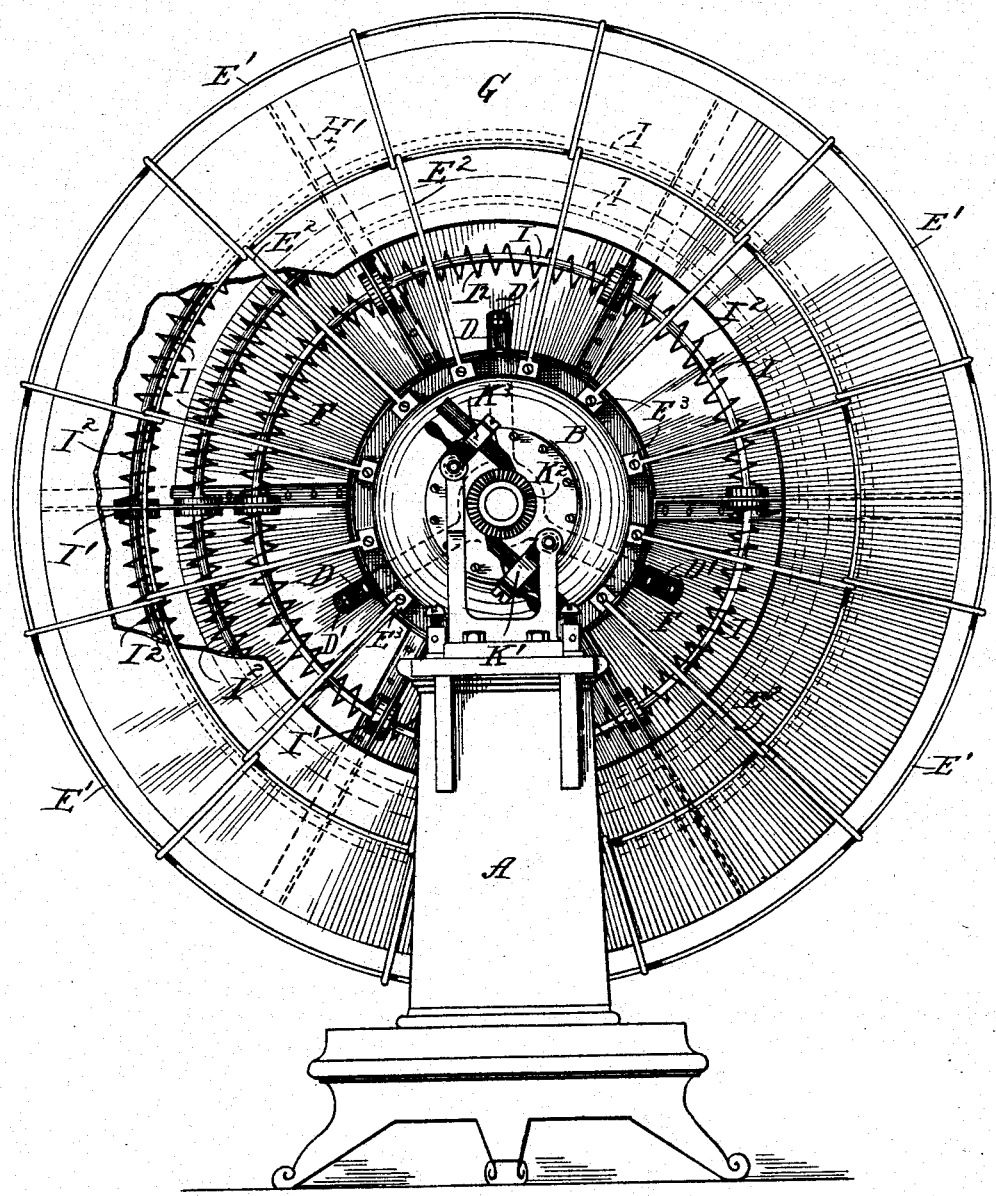

United States Patent Office.

GARDNER C. HAWKINS, OF BOSTON, MASSACHUSETTS, ASSIGNOR TO THE BAY STATE ELECTRIC HEAT & LIGHT COMPANY, OF JERSEY CITY, NEW JERSEY.

ELECTRIC HEATER.

SPECIFICATION forming part of Letters Patent No. 676,949, dated June 25, 1901.

Application filed September 26, 1898. Serial No. 691,903. (No model.)

*To all whom it may concern:*

Be it known that I, GARDNER C. HAWKINS, of Boston, in the county of Suffolk and State of Massachusetts, have invented certain new and useful Improvements in Electric Heaters, of which the following is a specification.

My invention relates to improvements in electric heating apparatus; and its object is to rapidly diffuse and radiate heat from heat-developing electric conductors or resistances, so that the heat may be evenly diffused throughout the apartment to be heated. To accomplish this result, I employ a fan and electric motor for operating the fan and preferably locate the heat-developing electric conductors or resistances upon the fan. When the electric current is turned on, the fan revolves and throws the air in a nearly-horizontal direction and the heat from the electric conductors or resistances is removed or displaced therefrom by the movement of the fan as the air passes over said resistances or conductors.

My invention consists of certain novel features hereinafter described, and particularly pointed out in the claims.

In the accompanying drawings, which illustrate a construction embodying my invention, Figure 1 is a side view of an electric heater and showing a fan containing my improvements in section. Fig. 2 is a view looking from the rear of the motor and partially broken away to show the interior construction. Fig. 3 is a detail front view of my improved electrical heating fan.

Like letters of reference refer to like parts throughout the several views.

B represents the usual electric motor supported by the base A and having a hollow shaft C. Mounted fast upon the shaft C at its front end is a spider D, to which is secured the fan E, composed of the inner and outer connected disks F and G of any suitable material and inclosed within a guard E', supported by the braces E², secured at E³ to the motor. The arms of the spider D are secured at their outer ends D' to the inner cones F of said fan and the inner cones F are secured to the outer cones G by the blades H having the flange H' secured to the outer cones G and the flange H² secured to the inner cones F, so that the inner and outer cones of the fan are secured and rotate together. Between the inner and outer cones F and G extend any desired number of insulated rods I, which pass through insulating-boxes I' in the blades H. The heat-developing electrical conductors or resistances I² are coiled around the insulated rods I and supported in position thereby. The electric current coming through the brush K' and collector-ring K passes through the wire J to the inner coiled heat-developing electric conductor I² and then to the second heat-developing electric conductor I² through the connecting-wire I³ and to the third heat-developing electric conductor I² through the connecting-wire I⁴, and the current passes from the last heat-developing electric conductor out through the wire J' to the collector-ring K² and brush K³. By forming the heat-developing electric conductors or resistances in coils a large area of heating-surface is provided and the air passing between the cones F and G from the rear is heated as it passes through said cones out through the front of the fan into the apartment to be heated. The construction of the fan above described and shown in its revolution produces a strong suction on the air at the inlet at the rear and pulls it through and throws it out at the front or discharge. The preferable arrangement of the heat-developing electric conductors or resistances is staggered, as shown, in order to fully intercept the heated air on its passage between the two cones.

The heat from the electric conductors or resistances I² is absorbed by the air in its passage over the coils and is delivered at the outlet of the fan in a nearly-horizontal direction instead of allowing it to rise to the ceiling, as is the case with the usual form of electric heaters. The horizontal diffusion of the heated air by the fan renders the temperature of the room more equable than where the heat is allowed to rise and become stored at the ceiling.

The rapidly-moving current of air passing through the fan increases the life of the heating resistances or conductors, owing to the rapid removal of the heated air from the heating-surfaces of said conductors or resistances, because they are kept at a low temperature by said rapid removal of the heat, although giving off a large amount of heat to the rapidly-moving air.

Although but three coils are shown, yet it will be understood that any number of coils of heat-developing electric resistances or conductors may be employed. If it be desired to use the fan for cooling instead of heating purposes, the brushes K' and K³ can be removed from the collector-rings and the fan will be in its normal condition without heat.

By locating the cones as nearly horizontal to the axis C as possible for the operation of the fan the air is drawn in at the rear and thrown out at the front in a nearly-horizontal direction into the apartment. If the cones were parallel with the axis, there would be no movement of the air by the fan. The inlet at the rear of the cones is preferably wider than at the outlet for the purpose of compressing the air and giving it the greatest velocity of delivery at the front.

I do not limit myself to the arrangement and construction shown, as the same may be varied without departing from the spirit of my invention.

Having thus ascertained the nature of my invention and set forth a construction embodying the same, what I claim as new, and desire to secure by Letters Patent of the United States, is—

1. In an electric heating apparatus, a fan composed of cones with blades between said cones and secured thereto, a motor for operating said fan, an electric heater consisting of one or more heat-developing electric conductors or resistances located in and passing through said blades between said cones, and insulating means in the blades for the electric conductors.

2. In an electric heating apparatus, a fan composed of cones at an angle to the axis of the fan with blades between said cones and secured thereto, a motor for operating said fan, an electric heater consisting of one or more heat-developing electric conductors or resistances located in and passing through said blades between said cones, and insulating means in the blades for the electric conductors.

3. In an electric heating apparatus, a fan composed of cones at an angle to each other and to the axis of the fan with blades between said cones and secured thereto, a motor for operating said fan, an electric heater consisting of one or more heat-developing electric conductors or resistances located in and passing through said blades between said cones, and insulating-boxes located in said blades and through which said heat-developing electric conductors or resistances pass.

4. In a heating apparatus, a fan composed of cones at an angle to the axis of said fan with blades between said cones and secured thereto, a motor for operating said fan, a heating medium located in and passing through said blades, and insulating means in the blades for said heating medium.

5. In an electric heating apparatus, a fan composed of cones at an angle to the axis of the fan and to each other with blades between said cones and secured thereto, a motor for operating said fan, an electric heater consisting of one or more heat-developing electric conductors or resistances located in and passing through said blades between said cones, and insulating means in the blades for the electric conductors.

6. In a heating apparatus, a fan composed of cones at an angle to the axis of said fan with blades between said cones and secured thereto, a motor for operating said fan, a heating medium carried by said fan and located in and passing through said blades, and insulating means in the blades for said heating medium.

7. In a heating apparatus, a fan, a motor for operating said fan, a heating medium located in and passing through the blades of said fan and supported thereby and consisting of one or more heat-developing electric conductors or resistances, and insulating means in the blades for said heating medium.

In testimony whereof I have signed my name to this specification, in the presence of two subscribing witnesses, this 22d day of September, A. D. 1898.

GARDNER C. HAWKINS.

Witnesses:
 LOUIS P. HAGER,
 EDWIN F. PORTER.